United States Patent
Leitgeb et al.

(10) Patent No.: US 6,560,274 B1
(45) Date of Patent: May 6, 2003

(54) TRANSCEIVER

(75) Inventors: Manfred Leitgeb, Gramatneusiedl (AT); Rene Madle, B.D. Altenburg (AT); Erwin Postmann, Forchtenstein (AT); Franz Stimpfl, Kottingbrunn (AT); Jörg Swetina, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 108 days.

(21) Appl. No.: 09/669,800

(22) Filed: Sep. 26, 2000

Related U.S. Application Data

(63) Continuation of application No. PCT/DE99/00552, filed on Mar. 2, 1999.

(30) Foreign Application Priority Data

Mar. 26, 1998 (DE) ......................... 198 13 533

(51) Int. Cl.⁷ ................................. H04B 1/38
(52) U.S. Cl. ...................... 375/219; 455/560
(58) Field of Search ............... 375/219, 220, 375/222, 265; 455/550, 73, 575, 78, 553, 557, 560, 31.3, 11.1; 379/418, 428.02, 428.03; 370/278, 282; 340/5.61, 310.06

(56) References Cited

U.S. PATENT DOCUMENTS

| | | | | | |
|---|---|---|---|---|---|
| 5,486,818 A | * | 1/1996 | Loponen | ..................... | 128/903 |
| 5,598,042 A | * | 1/1997 | Mix et al. | ................... | 307/112 |
| 5,831,514 A | * | 11/1998 | Hilpert et al. | ............. | 219/202 |
| 5,956,650 A | * | 9/1999 | Suzuki et al. | ............... | 455/550 |
| 6,026,280 A | * | 2/2000 | Yokomura | ................... | 455/78 |
| 6,226,529 B1 | * | 5/2001 | Bruno et al. | ................ | 455/557 |
| 6,272,359 B1 | * | 8/2001 | Kivela et al. | ............... | 455/567 |

* cited by examiner

Primary Examiner—Chi Pham
Assistant Examiner—Emmanuel Bayard
(74) Attorney, Agent, or Firm—Laurence A. Greenberg; Werner H. Stemer; Ralph E. Locher

(57) ABSTRACT

A (mobile) transceiver can be switched into different equipment states, and is provided with an equipment state in which supplementary functions (appointment calendar, games, etc.)—which do not require any transmission via a radio interface of the transceiver—can be executed without any transmission of the transceiver via the radio interface. In particular, there is no transmission of a signal or organizational data which is normally automatically transmitted when a transceiver is activated or in a standby or a ready-to-receive state.

20 Claims, 2 Drawing Sheets

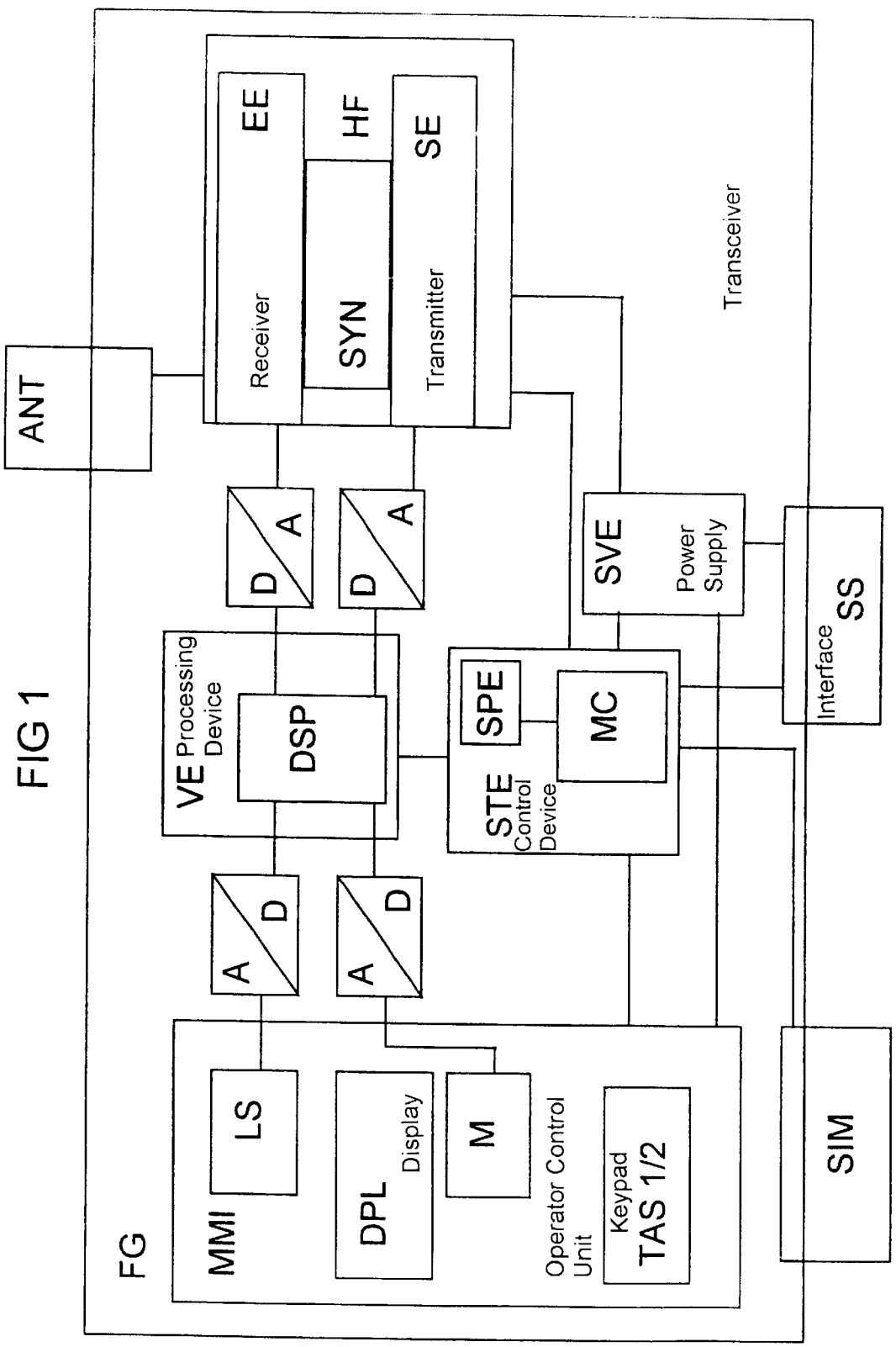

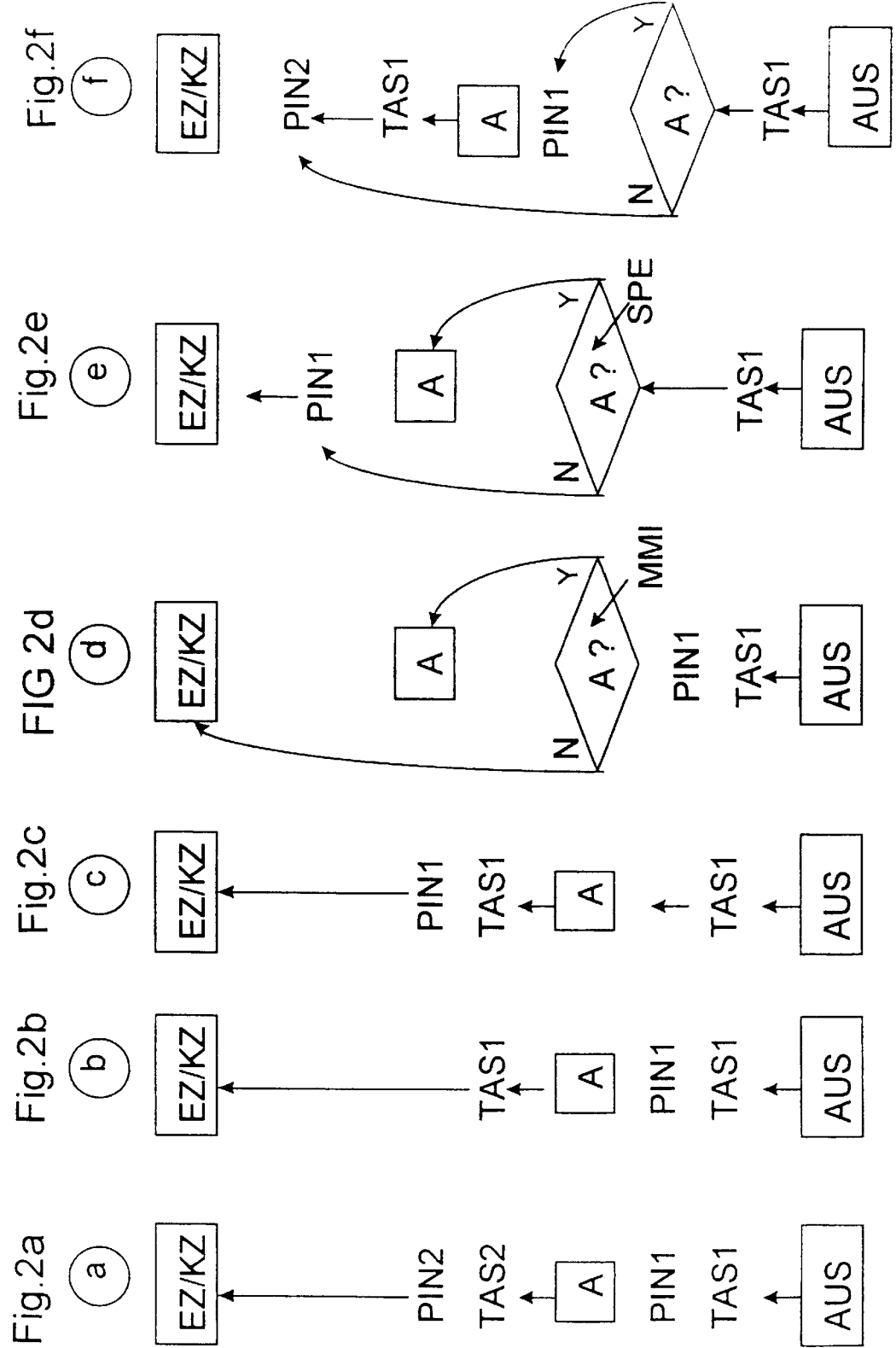

TRANSCEIVER

CROSS-REFERENCE TO RELATED APPLICATION

This is a continuation of copending International Application PCT/DE99/00552, filed Mar. 2, 1999, which designated the United States.

BACKGROUND OF THE INVENTION

Field of the Invention

The invention relates to a transceiver, in particular to a mobile radio transceiver, which can be switched into various equipment states.

Modern mobile radio transceivers for communication via cellular mobile radio networks not only transmit user data via the radio interface in the communication phase, but also exchange signaling or organizational data with the mobile radio network or the corresponding control center or exchange during a standby phase or a ready-to-receive state. For example, in the ready-to-receive state, the mobile radio transceiver constantly searches for a base station with the most favorable transmission conditions and selects this base station for a possibly following communication phase.

In addition, modern mobile radio transceivers have an increasing number of supplementary functions (for example games, appointments calendar), which are available to the user in addition to the actual communication function but do not require the transmission of signals via the radio interface for carrying them out.

In the case of previously known mobile radio transceivers, after switching on the device and a possible identification of the subscriber, they automatically go into the ready-to-receive state. To get into the ready-to-receive state, initially a scanning operation is required, i.e. a suitable second transceiver (base station) with which the transceiver can exchange information via the radio interface is determined and information is subsequently transmitted into the mobile radio network for authentication and registration. In the ready-to-receive state, the supplementary functions can then also be carried out. This results in the disadvantage that the execution of the supplementary functions is not possible without transmitting at least signaling or organizational information via the radio interface. However, in many cases, such as for example in aircraft, hospitals etc., this is prohibited or at least undesired.

SUMMARY OF THE INVENTION

It is accordingly an object of the invention to provide a transceiver which overcomes the above-mentioned disadvantages of the prior art devices of this general type, which allows supplementary functions to be executed in a simple and user-friendly way without transmitting signals via a radio interface.

With the foregoing and other objects in view there is provided, in accordance with the invention, a transceiver which includes a device for transmitting and receiving signaling information and user information. A controller is connected to the device and switches the transceiver into first equipment states including a communication state and a ready-to-receive state in which the transceiver at least at times transmits at least the signaling information to a base station. The controller also switches the transceiver into second equipment states including a switched-off state and an application state in which the transceiver does not transmit the signaling information to the base station. An operator control unit is connected to the controller and initiates equipment state changes.

The invention is accordingly based on the idea of providing in the transceiver not only first equipment states, which include a communication state for a corresponding communication phase (user data transmission) and a ready-to-receive state, but also second equipment states, which includes a switched-off state and an application state. In this case, the supplementary functions of the transceiver can be executed during the application state without transmitting signals via the radio interface.

The application state is understood here to be a state of the transceiver in which, although essential units of the equipment, such as for example the controller or the display, are switched on and supplied with power, no signals are transmitted via the radio interface and transmitting and receiving devices are possibly also deactivated or not supplied with power. This achieves the effect that supplementary functions of the transceiver can be executed in environments in which it is not allowed or not desired to transmit signals via the radio interface.

Developments of the invention concern advantageous variants of the user prompting for selection of the various equipment states. This achieves the effect that the selection of the equipment states desired by the user can take place in a convenient and intuitive way.

In accordance with an added feature of the invention, the transceiver automatically initiates a next state following the switched-off state according to a presetting.

In accordance with an additional feature of the invention, a next state following the switched-off state takes place by a user via the operator control unit.

In accordance with another feature of the invention, the transceiver is switched from the switched-off state into the application state and from the application state into one of the first equipment states.

In accordance with another added feature of the invention, the transceiver is switched from the switched-off state into one of the first equipment states.

In accordance with another additional feature of the invention, the operator control unit has a keypad button and the transceiver can be changed from the switched-off state into the application state and be changed from the application state into one of the first equipment states by actuating the keypad button.

In accordance with a further added feature of the invention, the transceiver requests a subscriber identification which takes place before a change from the switched-off state into the application state is executed.

In accordance with a further additional feature of the invention, the transceiver requests a subscriber identification which takes place before a change from the application state into one of the first equipment states is executed.

In accordance with a concomitant feature of the invention, the transceiver requests a first subscriber identification which takes place before a change from the switched-off state to the application state is executed and requests a second subscriber identification which takes place before a change to one of the first equipment states is executed.

Other features which are considered as characteristic for the invention are set forth in the appended claims.

Although the invention is illustrated and described herein as embodied in a transceiver, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a block diagram of a transceiver; and

FIGS. 2a–2f are flow diagrams for different configuration variants.

DESCRIPTION OF THE PREFERRED EMBODIMENTS

In all the figures of the drawing, sub-features and integral parts that correspond to one another bear the same reference symbol in each case. Referring now to the figures of the drawing in detail and first, particularly, to FIG. 1 thereof, there is shown a transceiver FG containing an operator control unit MMI, a control device STE, a processing device VE, a power supply device SVE, a subscriber identification module SIM, an interface SS for data transmission and for supplying power, a radio frequency part HF containing a receiving device EE, a transmitting device SE, a frequency synthesizer SYN, and an antenna device ANT. Individual elements of the transceiver FG are also interconnected by conductor tracks, wires, cables and/or bus systems.

The operator control unit MMI contains a loudspeaker element LS for playing back audio signals and a microphone element M for picking up audio signals. In addition, the operator control unit MMI is provided with a keypad TAS for the input of numbers and letters and for the selection of menu items. The menu items, numbers or other information relevant for the communication procedure or the execution of the supplementary functions can be presented by a display DPL.

The control device STE essentially contains a microcontroller MC and the processing device VE contains a digital signal processor DSP, both having read and write access to memory chips SPE. The microcontroller MC controls and monitors all the essential elements and functions of the transceiver FG and essentially controls the communication and signaling procedures and the switching of the transceiver into the desired equipment states. Analog audio signals and analog signals originating from the radio frequency part HF are converted into digital signals by analog/digital converters A/D and are processed by the digital signal processor DSP. After processing, the digital signals are converted in turn into analog audio signals and analog signals to be fed to the radio frequency part HF by digital/analog converters D/A. For this purpose, a demodulation or modulation is possibly carried out.

Stored in the volatile or non-volatile memory chips SPE are the program data required for controlling the transceiver FG, the communication procedure and the supplementary functions, equipment information, information and settings entered by the user and information arising during the processing of signals.

The essential elements of the transceiver FG are supplied with power by the power supply device SVE.

For receiving and transmitting signals via the radio interface of a mobile radio system, the antenna device ANT is provided. In the case of some known mobile radio systems, such as the global system for mobile communication (GSM), the signals are received and transmitted in timed pulses or so-called bursts.

The mobile radio transceiver also has a socket for the subscriber identification module SIM or a corresponding, possibly permanently installed, element for the storage of subscriber- or network-specific information.

FIGS. 2a–2f shows different variants a to f for user prompting and for the interactive procedure for the selection of an equipment state using the operator control unit MMI. The controlling of the procedures takes place by the controlling device STE, which may also be software-controlled.

Variant a shown in FIG. 2a shows that the transceiver FG is initially in the switched-off state OFF. In the switched-off state OFF, all the essential elements of the transceiver FG are switched off; however, certain elements, such as for example the element for determining a time of day or certain memory elements, can be supplied with energy. After the actuation of a keypad button TAS1, the user is requested to enter his personal identification number PIN1. After the transmission of the personal identification number PIN1, the transceiver is switched into an application state A. In the application state A, the following functions can be carried out for example: games, entry of new telephone numbers or addresses, managing of an appointments calendar, dictation onto a storage medium integrated in the transceiver, preparation of brief messages or e-mails to be sent later or an infrared transmission of data from or to another electronic device, such as a printer, scanner or another transceiver. In one variant of the invention, these supplementary functions can also be executed in a first state.

To get from the application state A into a first equipment state, for example a ready-to-receive state EZ or a communication state KZ, another keypad button TAS2 is pressed and, after the entry of a second personal identification number PIN2 and its verification, the corresponding change of stage is initiated. In this case, the PIN2 may in particular be a personal identification number which is stored on an insert card (SIM) or in the network.

Variant b shown in FIG. 2b shows that to get from the application state A into a first equipment state EZ/KZ requires the actuation of the keypad button TAS1 also required for changing the equipment state from the switched-off state OFF into the application state A. The entry of the personal identification number PIN2 is not required for the change of state from the application state A into the first equipment state EZ/KZ.

Variant c shown in FIG. 2c shows that to get from the switched-off state OFF into the application state A, the entry of a personal identification number is not required. Instead of this, the entry of the personal identification number PIN1 is required for a change of state from the application state A into the first equipment state EZ/KZ.

Variant d shown in FIG. 2d shows that once the personal identification number PIN1 has been entered, the user is asked, for example via the display DPL or a voice output, whether the transceiver FG is to be switched into the application state A. If he answers this question with a yes Y, a change of state into the application state A takes place. If he answers the question with a no N, a change of state into the first equipment state EZ/KZ takes place. The user entry can in this case likewise take place by buttons or corresponding soft keys or via voice.

Variant e shown in FIG. 2e shows that once the keypad button TAS1 has been actuated, an inquiry concerning the equipment state now to be set takes place internally in the equipment by the controlling device STE. For this purpose, the controlling device STE reads from the memory device SPE information which has possibly been entered or set in advance by the user and executes in accordance with this information a change of equipment state. Before switching the transceiver FG into the first equipment state EZ/KZ, the subscriber identification takes place by inquiring the personal identification number PIN1.

Variant f shown in FIG. 2f shows that after actuation of the keypad button TAS1, the inquiry concerning the equipment state into which the device is now to be switched takes place. If the application state A is selected, the first personal identification number PIN1 is to be entered. If the first equipment state EZ/KZ is selected, the second personal identification number PIN2 is to be entered. To change from the application state A into the first equipment state EZ/KZ, the same keypad button TAS1 is to be actuated and after this the second personal identification number PIN2 is to be entered. In one variant, after actuation of the keypad button TAS1, the entry of the personal identification number is requested. Depending on the personal identification number PIN1 or PIN2 entered, the transceiver is automatically switched into the corresponding equipment state.

Another development provides that, in certain environments, the transceiver FG is automatically switched from the first equipment state EZ/KZ into the application state A. The control information necessary for this can be transmitted, for example within an aircraft, by an infrared transmission to the controlling device STE of the transceiver FG.

Another variant provides that, after the ending of certain first procedures in the application state A, a second procedure specific for these first procedures is automatically carried out in a first equipment state. In this way it is possible in the application state A to write an e-mail which is transmitted via the mobile radio network after the actuation of a button and the associated change into the communication state KZ.

In a further development of the invention, the subscriber identification does not take place by the entry of a personal identification number PIN but by a fingerprint identification.

It is also possible to leave the selection of one of the variants described above optionally to the user. A corresponding setting can be stored in the memory SPE.

The variants described above allow a person skilled in the art easily to use in the transceiver further variants, possibly containing a combination of the variants described above.

We claim:

1. A transceiver, comprising:
    a device for transmitting and receiving signaling information and user information;
    a controller connected to said device, for switching the transceiver into a first equipment state including a communication state and a ready-to-receive state in which the transceiver at least at times transmits at least the signaling information to a base station, and for switching the transceiver into a second equipment state including a switched-off state and an application state permitting execution of a supplementary function, without transmitting any of the signaling information to the base station; and
    an operator control unit connected to said controller and initiating equipment state changes.

2. The transceiver according to claim 1, wherein the transceiver automatically initiates a next state following the switched-off state according to a presetting.

3. The transceiver according to claim 1, wherein a next state following the switched-off state takes place by a user via said operator control unit.

4. The transceiver according to claim 1, wherein the transceiver is switched from the switched-off state into the application state and from the application state into the first equipment state.

5. The transceiver according to claim 1, wherein the transceiver is switched from the switched-off state into the first equipment state.

6. The transceiver according to claim 1, wherein said operator control unit has a keypad button and the transceiver can be changed from the switched-off state into the application state and be changed from the application state into the first equipment state by actuating said keypad button.

7. The transceiver according to claim 1, wherein the transceiver requests a subscriber identification which takes place before a change from the switched-off state into the application state is executed.

8. The transceiver according to claim 1, wherein the transceiver requests a subscriber identification which takes place before a change from the application state into the first equipment state is executed.

9. The transceiver according to claim 1, wherein the transceiver requests a first subscriber identification which takes place before a change from the switched-off state to the application state is executed and requests a second subscriber identification which takes place before a change to the first equipment state is executed.

10. A transceiver, comprising:
    a device for transmitting and receiving signals via a radio interface and executing a supplementary function; and
    a controller connected to said device, for switching the device in a first equipment state in which the device at least at times transmits at least a signaling information via the radio interface, and for switching the device into a second equipment state including a switched-off state and an application state permitting execution of the supplementary function, without transmitting any signals via the radio interface.

11. The transceiver according to claim 10, further comprising an operator control unit connected to said controller and initiating equipment state changes.

12. The transceiver according to claim 10, wherein the device automatically initiates a next state following the switched-off state according to a presetting.

13. The transceiver according to claim 11, wherein a next state following the switched-off state takes place by a user via said operator control unit.

14. The transceiver according to claim 10, wherein the device is switched from the switched-off state into the application state and from the application state into the first equipment state.

15. The transceiver according to claim 10, wherein the device is switched from the switched-off state into the first equipment state.

16. The transceiver according to claim 11, wherein said operator control unit has a keypad button and the device can be changed from the switched-off state into the application state and be changed from the application state into the first equipment state by actuating said keypad button.

17. The transceiver according to claim 10, wherein the device requests a subscriber identification which takes place before a change from the switched-off state into the application state is executed.

18. The transceiver according to claim 10, wherein the device requests a subscriber identification which takes place before a change from the application state into the first equipment state is executed.

19. The transceiver according to claim 10, wherein the device requests a first subscriber identification which takes place before a change from the switched-off state to the application state is executed and requests a second subscriber identification which takes place before a change to the first equipment state is executed.

20. The transceiver according to claim 10, wherein the transceiver is part of a mobile cellular radio.

* * * * *